United States Patent [19]

McCombs

[11] Patent Number: 5,232,234
[45] Date of Patent: Aug. 3, 1993

[54] PNEUMATICALLY OPERATED ADJUSTABLE SLIDING TRAILER SUPPORT

[76] Inventor: Clint McCombs, P.O. Box 233, Lake, Miss. 39092

[21] Appl. No.: 418,779

[22] Filed: Oct. 2, 1989

Related U.S. Application Data

[63] Continuation of Ser. No. 235,178, Aug. 23, 1988, abandoned.

[51] Int. Cl.$^5$ .............................................. B60G 5/06
[52] U.S. Cl. ................................. 280/80.1; 280/149.2
[58] Field of Search ................... 280/656, 80.1, 149.2, 280/81.1, 43.17, 43.23

[56] References Cited

U.S. PATENT DOCUMENTS

| | | | |
|---|---|---|---|
| 2,907,576 | 10/1959 | Hutchens | 280/426 X |
| 2,968,495 | 1/1961 | Hutchens | 280/426 |
| 3,123,377 | 3/1964 | Hutchens | 280/682 |
| 3,126,209 | 3/1964 | Jewell et al. | 280/81 R |
| 3,224,522 | 12/1965 | Fleming | 280/682 |
| 3,372,946 | 3/1968 | Hutchens | 280/81 R |
| 3,533,641 | 10/1970 | Driskill | 280/682 X |
| 3,659,671 | 5/1972 | Heinze | 280/682 X |
| 3,963,259 | 6/1976 | Massey | 280/80 B |
| 4,284,156 | 8/1981 | Carstensen et al. | 280/81 R X |
| 4,286,797 | 9/1981 | Mekosh, Jr. et al. | 280/80 B |
| 4,344,642 | 8/1982 | Goth | 280/682 |
| 4,353,565 | 10/1982 | Smith et al. | 280/80 B |
| 4,588,197 | 5/1986 | Benedetto, Jr. | 280/47.21 X |
| 4,641,846 | 2/1987 | Ehrhart | 280/80 B |
| 4,660,843 | 4/1987 | Hicks | 280/80 B |

*Primary Examiner*—Margaret A. Focarino
*Assistant Examiner*—Michael Mar
*Attorney, Agent, or Firm*—Pravel, Hewitt, Kimball & Krieger

[57] ABSTRACT

A pneumatically operated adjustable trailer chassis includes a frame which slides with respect to the trailer portion of a tractor trailer rig. The frame carries wheels with the sliding support portion so that the wheel position of the wheels can be adjusted for and after with respect to the frame portion of the tractor trailer rig. A locking pin is used to rigidly support and fix the position of the sliding support with respect to the frame and thus the position of the wheel with respect to the trailer. A pneumatic operator engages and disengages the locking pin from a remote location. An interface connects the pneumatic operator with the air supply line that supplies air to the brakes of the trailer wheels so that compressed air supplied aft to operate the brakes also operates the locking pin.

7 Claims, 2 Drawing Sheets

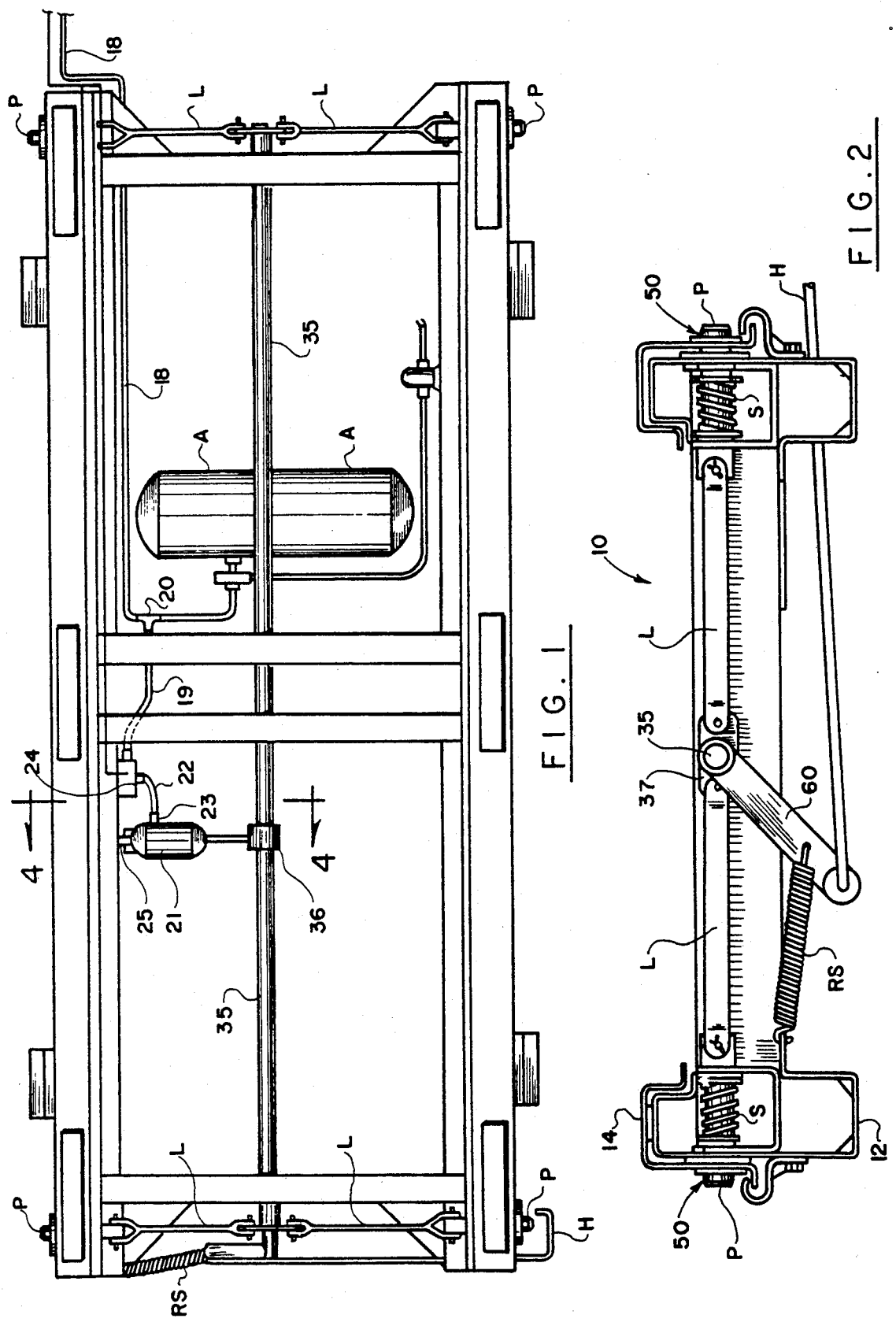

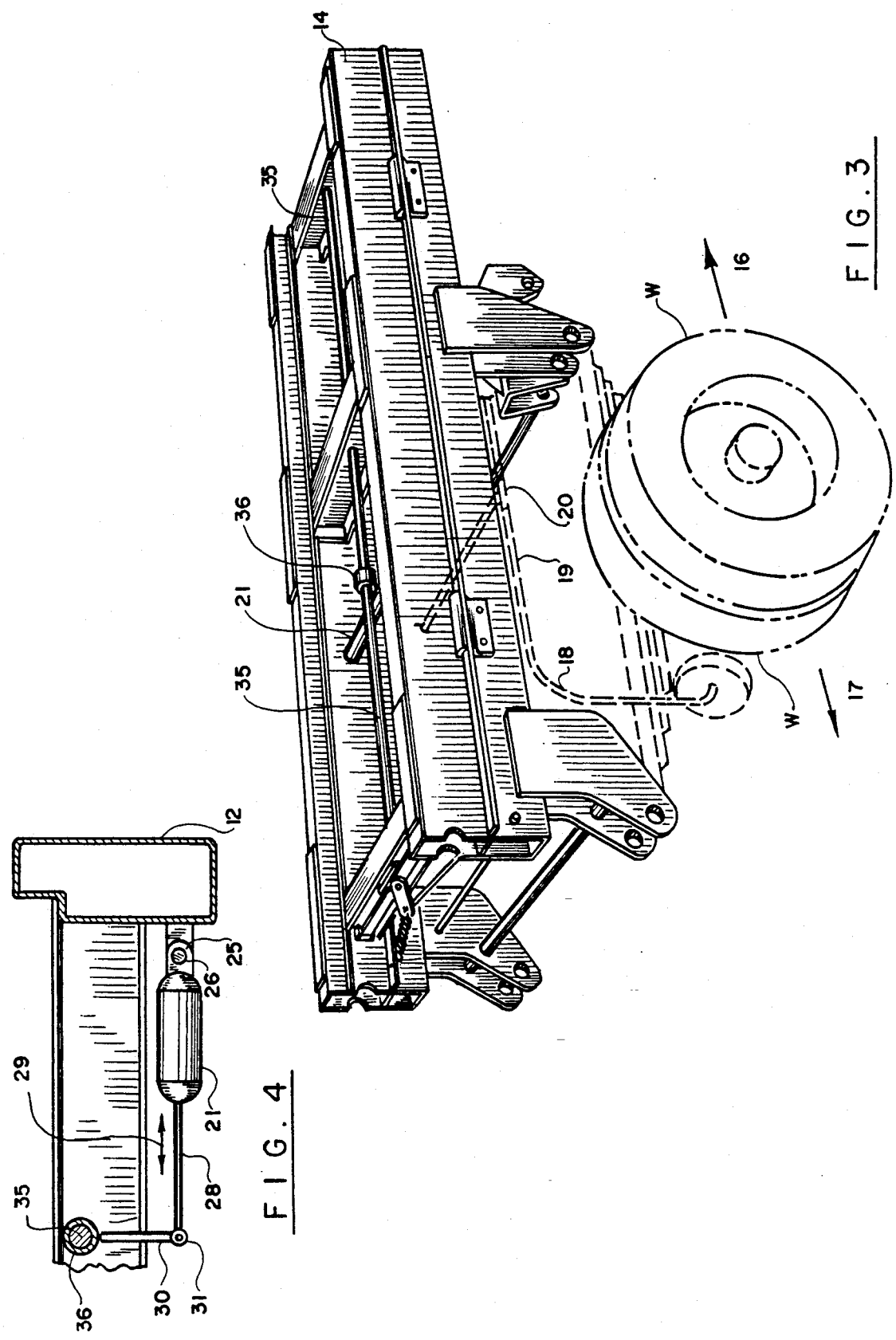

PNEUMATICALLY OPERATED ADJUSTABLE SLIDING TRAILER SUPPORT

This is a continuation of co-pending application Ser. No. 07/235,178 filed on Aug. 23, 1988, now abandoned.

BACKGROUND OF THE INVENTION

1. Field of the Invention

The present invention relates to tractor trailer rigs and more particularly relates to an improved roller slide mechanism for tandem wheel vehicles wherein a sliding subframe portion connected to the vehicle body carries wheels with air operated brakes, wherein an interface connects an operator for locking a pin to fix the position of the sliding portion with the air supply line to the brakes.

2. General Background

A common arrangement for transporting freight is a tractor trailer rig commonly referred to as an "eighteen-wheeler". Such tractor trailer rigs typically employ a short but powerful "tractor" portion which is normally a diesel powered truck having a coupling at its rear end portion for attaching the trailer portion thereto. The trailer is much longer than the tractor portion and includes at its rear end portion a plurality of wheels.

There are commercially available frames which use a moving, usually sliding connection between the wheels and the frame of the trailer so that the wheel base position of the wheels can be varied with respect to the trailer frame. The adjustable vehicle frames, adjustable running gear, adjustable slide assemblies and load equalizing devices as they are sometimes called are known in the art. Such assemblies are provided to compensate for widely varying load conditions for trailers. Frequently, trailers and like vehicles cannot always be loaded equally throughout their length with the result that the loads bearing on the wheels supporting the vehicle are not always uniform and many prior devices have been devised to compensate for this unbalanced load condition. Such sliding support arrangements for the wheels are commercially available, and manufactured for example by Hutchens, such as for example shown and described in U.S. Pat. No. 3,372,946 issued to C. T. Hutchens and entitled "Roller Slides for Trailer". U.S. Pat. No. 3,372,946 is hereby incorporated herein by reference.

Subframes use a sliding portion and one or more spring loaded locking pins that engage holes on both the sliding portion and the fixed portion of the subframe. Typically a rod which is hand actuated is pulled to rotate a shaft which engages or disengages the locking pins.

The problem with such manual locking arrangements is that the pins typically are a very long distance from the cab of the truck and it is aggravating and time consuming for the operator of the truck to leave the cab, walk to the rear of the truck and then manually engage or disengage the locking pins.

There are several other patents naming C. T. Hutchens as patentee including U.S. Pat. No. 2,907,576 entitled "Hydropneumatic Equalizing Suspension for Vehicles", U.S. Pat. No. 2,968,495 entitled "Mechanism for Steering Tandem Wheels of a Tractor Trailer Assembly", and U.S. Pat. No. 3,123,377 entitled "Tandem Suspension for Eliminating Brake Hopping".

Another patent that describes a mechanism for adjustably interconnecting a vehicle running gear with the vehicle body is described in U.S. Pat. No. 3,126,209 entitled "Means for Adjustably Interconnecting a Vehicle Running Gear and Body". The '209 patent uses a cam actuated handle to operate locking pins.

In U.S. Pat. No. 3,224,522 entitled "Vehicle Spring Axle Loading Control System", a fluid control system enables the operator to control at will the relative inflation of respective air bags stacked in multiples. These air bags are pneumatic springs arranged to provide variable support for the vehicle frame from the mechanical spring structure forwardly and rearwardly of the tag axle. Air supplied to the pneumatic spring through a pressure supply line which leads to a valve normally located in the cab of the vehicle. A compressor delivers through a supply pipe air under pressure.

U.S. Pat. No. 3,533,641 entitled "Power Actuated Undercarriage for Mobile Home" illustrates a power actuated mechanism for facilitating the conversion of a mobile home unit between transit and occupancy condition.

U.S. Pat. No. 3,659,671 entitled "Tag Wheel Lift" describes a spring seat mounted on each side of a pivot shaft which is mounted transversely of a truck frame between the drive wheels and the tag wheels and is pivoted by a rocker arm pivotally connected to a piston rod of a hydraulic cylinder.

A sliding axle assembly for flat deck trailers is the subject of U.S. Pat. No. 3,963,259. In the '259 patent, two spaced and parallel V-tracks are secured to the underside of a trailer body and engaging a plurality of rollers having V-grooves therein which are mounted upon the main undercarriage frame thus facilitating easy movement and adjustment of the undercarriage relative to the trailer body. Locking means are provided at intervals between the undercarriage and the trailer body so that the two may be locked together and a plurality of selective positions. This construction keeps the undercarriage in true alignment with the trailer frame without the need for side thrust rollers or guides. Furthermore the V-tracks maintain engagement with the V-rollers due to the weight of the trailer frame.

Other patents disclosing tandem axle suspensions include the King U.S. Pat. No. 4,200,267; the Carstensen et al. U.S. Pat. No. 4,284,156 and the Goth U.S. Pat. No. 4,344,642.

The wheels of the trailer type which use such subframes such as the Hutchens Model 8-8000 normally have brakes which are air operated. The air supply line extends aft of the tractor trailer rig, so that air can be supplied to the wheels.

SUMMARY OF THE PRESENT INVENTION

With the present invention, the air supply line to the brakes is interfaced with a pneumatic operator which is positioned to operate the locking pin. Thus the locking pin can be operated from a remote location and preferably the cab of the tractor trailer rig in order to engage/disengage the locking pins.

The present invention thus provides an improved adjustable slide assembly for tandem wheel tractor trailers. The apparatus includes a subframe portion which is connected to the trailer. A sliding undercarriage is connected to the subframe for carrying wheels with air pressure operated brakes. An air supply line extends to the rear portion of the trailer communicating with the brakes and supplying compressed air thereto for operating the brakes of the trailer. A locking pin is provided for affixing the sliding undercarriage portion with respect to the subframe. A pneumatic operator is provided for engaging and disengaging the locking pin to affix the subframe and undercarriage with respect to each other. An interface connects the pneumatic operator and the air supply so that the compressed air supplied to operate the brakes can also operate the locking pin.

In the preferred embodiment, the sliding undercarriage carries a plurality of openings and the subframe carries a corresponding plurality of openings so that openings on the subframe can align with the sliding undercarriage portion at various positions which can vary the position of the sliding undercarriage with respect to the frame thus changing the wheelbase position with respect to the trailer subframe.

In the preferred embodiment, the openings are spaced linearly along the length of the sliding undercarriage portion and the frame respectively.

In the preferred embodiment, the locking pins comprise a pair of opposed locking pins.

In the preferred embodiment, the locking pins cooperate with a central longitudinal shaft, a pair of locking pins are mounted on opposite sides of the shaft, and a link connects the central longitudinal shaft with the locking pins. An air operated cylinder rotates the shaft so that rotation of the shaft engages/disengages the pins.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 is a top view of the preferred embodiment of the apparatus of the present invention;

FIG. 2 is sectional view of an adjustable sliding trailer support as used with the preferred embodiment of the apparatus of the present invention;

FIG. 3 is a perspective view of the preferred embodiment of the apparatus of the present invention; and FIG. 4 is sectional view taken along lines 4—4 of FIG. 1.

DETAILED DESCRIPTION OF THE PREFERRED EMBODIMENT

FIGS. 1-4 illustrate the preferred embodiment of the present invention designated generally by the numeral 10. Adjustable slide assembly for 10 can typically be used for a tandem wheel, tandem axle multi-wheel tractor trailer rigs. The apparatus includes a subframe 12 portion which slides with respect to an uppermost fixed frame portion 14 which typically is attached to the trailer portion of the tractor trailer apparatus. The movable or sliding subframe 12 slides with respect to the fixed frame 14 that carries the trailer cargo carriage area. Wheels W can be adjusted forward or aft with respect to frame 14 (see arrows 16, 17 of FIG. 3). The wheels W typically would include a brake assembly (not shown) which is conventional and which is air operated using for example an air supply line 18 that extends to and communicates with the forward end portion of the tractor trailer rig and an air compressor e.g. carried by the tractor portion so that air can be supplied to the air brakes via air supply line 18 using the compressor, an accumulator or like supply of compressed air. The compressor (not shown) is a conventional, commercially available device typically carried on the vehicle tractor or truck portion of the tractor trailer rig. Thus the compressor, the air supply line 18 and the air brakes are conventional and part of the existing tractor trailer rig.

In the preferred embodiment of the apparatus of the present invention, supply line 18 also supplies a source of compressed air via branch supply line 19 so that pneumatically operated cylinder 21 can engage/disengage locking pins P. The locking Pins P can either rigidify the wheels with respect to the tractor trailer (when locked), or allow the wheels to move forwardly, or rearwardly with respect to the trailer (when released) for purposes of load distribution. This slideable support arrangement in general uses locking pins P for affixing the sliding portion of the support (carrying the wheels W) with respect to the fixed or trailer carrying portion of the support. An example of such a sliding support arrangement for tractor trailers using locking pins can be found in the Hutchens U.S. Pat. No. 3,372,946 entitled "Roller Slides For a Trailer" which is hereby incorporated by reference.

With the improved locking assembly of the present invention, the same supply of compressed air supplied to the air operated brakes of the tractor trailer rig can be used to supply compressed air to operate the locking pins of the sliding support arrangement. In FIGS. 1 and 3, a "Tee" connection 20 is formed, taking compressed air from supply line 18 (which supplies compressed air from the compressor to the air brakes) to branch line 19, which then transmits compressed air to pneumatic cylinder 21. Cylinder 21 can be mounted upon the sliding 12 portion 12 of support 10 at gusset 25. Gusset 25 attaches to cylinder 21 at pinned connection 26 so that cylinder 21 can pivot with respect to gusset 25 which is welded for example to sliding portion 12. Cylinder 21 includes an extensible push rod 28 which moves inwardly and outwardly (see arrow 29). The inward and outward movement of extensible pushrod 28 rotates crank arm 30 which is pivotally connected at pivot 31 to extensible pushrod 28. Extension and retraction of pushrod 28 causes a corresponding rotation of shaft 35 which is coupled to crank 30 at bushing 36. Bushing 36 can be for example be welded to, or pinned to shaft 35.

Rotation of shaft 35 causes a rotation of crank 37 which pulls or pushes links L depending upon the direction of rotation of shift 35 causing locking pins P to alternatively engage/retract from provided spaced-apart openings 50. The openings 50 are spaced linearly (not shown) along the frame 14 so that the pins P can be inserted as desired in an opening that positions the wheels W optimally for a given load condition. Springs S can be used to return pins P to a locked position and hold them in that locked position after the pins P have been retracted during adjustment of the wheels W with respect to the trailer frame 14. Springs S prevent inadvertent removal of the locking pins from an operative locked position.

As a backup system, a handle H can be used to manually operate the locking pins P, which manual system is the operating mechanism disclosed in the Hutchens U.S. Pat. No. 3,372,946. Handle H connects to a rotating arm 60 which is connected rigidly with respect to shaft 35. A return spring RS holds crank 60 in a locked pin position when it is not being operated by handle H.

Thus, the present invention provides an improved arrangement for pneumatically operating an adjustable sliding trailer support wherein the available air supply for operating the air brakes can also be used to engage/- disengage the locking pins. The present invention thus provides a solution to the problem of engaging/disengaging the locking pins on adjustable sliding trailer supports which can be quickly and easily retrofitted to existing trailers in kit form.

The air supply can be bled via line 19 from air supply line 18 using a solenoid or like valving mechanism 24 which can be electrically operated from the vehicle cab. Electrical supply for operating the solenoid can be obtained from the wiring harness of the vehicle which typically runs electrical supply wiring fore and aft for operating electrical lights on the vehicle for example. An air tank or accumulator A can store a volume of compressed air if desired.

A control panel could be mounted in the cab of the tractor portion of the tractor trailer rig, having a toggle switch for example which could be designated with "on" and "off" positions. The operator would simply flip the toggle switch to the "on" position which would activate the solenoid to bleed compressed air from supply line 18 via branch line 19 to operate cylinder 21. Once the locking pins are released, the operator would simply pull a hand valve on the brakes, compressing the brakes to immobilize the wheels W. This compressing of the brakes also supplies compressed air to line 18. Then the operator would simply back up (or advance) the tractor rig perfecting a sliding of the trailer portion of the frame with respect to the wheeled portion of the frame which is held fast in a fixed position by the brakes. Once a desired position of the wheels is obtained with respect to the trailer, the locking pins P could be engaged in the desired position by simply releasing the toggle switch to the off position which releases the solenoid 24 and interrupts the flow of compressed air via line 19 to the cylinder 21. The return springs RS and the coil springs S would then lock the pins P into the appropriate locking hole 50 as desired.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A remotely-controlled suspension system for adjustably positioning a wheeled subframe at any selected one of a plurality of multiple positions relative to a cargo unit of a vehicle, comprising:
    (a) track means stationarily mounted on the cargo unit, and having a plurality of apertures spaced apart of one another along a longitudinal direction parallel to the direction of vehicle advancement;
    (b) actuatable locking means mounted on the wheeled subframe for joint movement therewith along the longitudinal direction relative to the track means, and operative for releasably locking the wheeled subframe to the cargo unit at said selected position, said locking means including at least one locking pin displaceable into and out of a selected one of the apertures that corresponds to said selected position;
    (c) actuating means for displacing said at least one locking pin between a locked state in which said at least one locking pin is displaced into said selected aperture to lock the cargo unit and the subframe at said selected position, and an unlocked state in which said at least one locking pin is displaced out of said selected aperture to unlock the cargo unit and the subframe and enable the cargo unit to be moved from the subframe to another selected one of the positions; and
    (d) a carriage mounted upon said track means for slidable movement therealong, said locking means being mounted on said carriage; and
    wherein said actuating means comprises power-assist means and said actuating means comprises a shaft journaled on the carriage for turning movement about the longitudinal direction; a pair of elongated arms extending in opposite transverse directions, each arm having one end connected to the shaft, and another end connected to a respective pin; a crank link fixedly mounted on the shaft and extending outwardly thereof to an offset end such that, in a locked position, said shaft, said elongated arms, said locking pins, and said apertures are substantially at the same height and are traversed by a common horizontal plane; an electrically-powered pneumatic device operatively connected to the offset end and operative, when electrical power is supplied to the pneumatic device from a remote activator, to turn the crank link and, in turn, the shaft through an angular distance sufficient to pull the arms in opposite directions and, in turn, to pull the pins out of the aligned apertures to the unlocked state.

2. The system according to claim 1, wherein the track means includes a pair of elongated tracks extending along the longitudinal direction and transversely spaced apart from each other; and wherein a first group of said apertures are spaced apart of one another on one of the tracks, and wherein a second group of said apertures are spaced apart of one another on the other of the tracks, and wherein each aperture of the first group is aligned along the transverse direction with each aperture of the second group.

3. The system according to claim 1, wherein the locking means is mounted on a carriage mounted on the tracks for sliding movement therealong, and wherein the locking means is mounted on the carriage and includes at least another locking pin identical to said at least one locking pin, said actuating means being operative for displacing said pins into an aligned pair of apertures of the first and second groups in the locked state, and for displacing said pins out of the aligned pair of apertures in the unlocked state.

4. The system according to claim 3, wherein the actuating means includes biasing means for constantly urging the locking pins into the locked state.

5. The drawbar arrangement of claim 1 wherein said carriage comprises a pair of slide tubes, each slide tube being of substantially rectangular cross-section and being mounted on said track means.

6. A multi-position arrangement for adjustably, interconnectably positioning relative to each other, at any selected one of a plurality of positions, wheeled units of a vehicle, comprising:
    (a) track means stationarily mounted on one of the wheeled units, and having a plurality of apertures spaced apart of one another along a longitudinal direction parallel to the direction of vehicle advancement;
    (b) actuatable locking means mounted on the other of the wheeled units for joint movement therewith along the longitudinal direction relative to the track means, and operative for releasably locking the wheeled units together at said selected position, said locking means including at least one locking pin displaceable into and out of a selected one of the apertures that corresponds to said selected position; and (c) actuating means for displacing said at least one locking pin between a locked state in which said at least one locking pin is displaced into said selected aperture to lock the wheeled units at said selected position, and an unlocked state in which said at least one locking pin is displaced out of said selected aperture to unlock the wheeled units and enable the latter to be moved relative to one another to another selected one of the positions wherein said actuating means comprises power-assist means including a remote actuator and said actuating means comprises a shaft journaled on the carriage for turning movement about the longitudinal direction, a pair of elongated arms extending in opposite transverse directions, each arm having one end connected to the shaft, and another end connected to a respective pin; a crank link fixedly mounted on the shaft and extending outwardly thereof to an offset end such that, in a locked position, said shaft, said elongated arms, said locking pins, and said apertures are substantially at the same height and are traversed by a common horizontal plane; an electrically-powered pneumatic device operatively connected to the offset end and operative, when electrical power is supplied to the pneumatic device from a remote activator, to turn the crank link and, in turn, the shaft through an angular distance sufficient to pull the arms in opposite directions and, in turn, to pull the pins out of the aligned apertures to the unlocked state.

7. The drawbar arrangement of claim 6 wherein said carriage comprises a pair of slide tubes, each slide tube being of substantially rectangular cross-section and being mounted on said track means.

* * * * *